United States Patent Office 3,684,529
Patented Aug. 15, 1972

3,684,529
SWEETENING COMPOSITIONS
James J. Liggett, Libertyville, Ill., assignor to
William E. Hoerres, Sheboygan, Wis.
No Drawing. Filed June 5, 1970, Ser. No. 43,985
Int. Cl. A23l 1/26
U.S. Cl. 99—141 A                              9 Claims

ABSTRACT OF THE DISCLOSURE

The invention relates to artificial sweetening compositions of saccharin plus glucono delta lactone and sodium gluconate in specified proportions.

---

The present invention relates to a new artificial sweetener composition and more particularly to compositions which have no calories or are substantially free of calories and which can be used for the sweetening of any food or beverage without leaving the bitter after-taste which is common for most known artificial sweeteners.

Heretofore, persons who have been advised to reduce their caloric intake, whether for medical reasons or for reasons of diet, generally have attempted to avoid sugar because of its high caloric value and to substitute an artificial sweetener such as saccharin. Although saccharin provides a high degree of sweetness and has substantially no caloric value, this substance suffers from the disadvantage of leaving a bitter after-taste in the mouth of the user. Attempts to overcome this difficulty by componding saccharin with other ingredients have not been entirely successful.

It is therefore a principal object of this invention to provide a sweetening composition which will overcome the above described disadvantage and limitation of artificial saccharin sweeteners.

Another object of the invention is to provide a new sugar-free sweetener which not only does not have any bitter after-taste but which also does not in any way adversely affect the taste of the food or beverage with which the same is used. It is yet a further object of the present invention to provide sweetening compositions which can be used with all types of foods, such as candy, baked goods, beverages, meat products, fruits and the like to give a true sweetening effect with substantially no calories and with no bitter after-taste other undesirable taste effects of known sweeteners.

These and other objects and features of the invention will be apparent from the consideration of the following detailed description of the invention taken in conjunction with the accompanying examples and the appended claims.

Broadly, the present invention comprises a sweetening composition consisting essentially of at least 50 perecnt by weight of an edible salt of saccharine in admixture with in the range of from about 5 to 25 percent by weight of glucono delta lactone and from about 5 to 25 percent by weight of sodium gluconate. It is intended herein that any non-toxic or pharmaceutically acceptable salt of saccharin can be used in the practice of the invention. Of special interest are the alkali metal and alkaline earth metal salts of saccharin. Sodium and calcium salts are best known and are preferred because of their availability and low toxicity. It has been found that when these three ingredients are used in combination, and particularly so in the proportions set forth, the resulting composition can be used for the sweetening of any food to a degree closely approximating the taste of natural sugar without leaving any bitter after-taste.

In accordance with one embodiment of the invention, the sweetening composition of the present invention can be combined with a solid pharmaceutical carrier and compressed into tablet form. Any of the customarily employed fillers and adjuvants such as dextrans and whey solids of high bulk and low density, lactose and starch can be added as a bulking agent, inert extender or carrier. Binders such as carboxymethylcellulose and acacia can also be employed. In addition, it may be desirable to include mixtures of carbonates, and organic acids in the manner well known in the art. Preferably such tablets should be proportioned in weight to provide sweetness equivalent of from ½ to 2 teaspoonsful of sucrose i.e., from about 2½ to 10 grams of sucrose.

In accordance with another modification of the present invention, the sweetening composition consisting essentially of sodium saccharin, glucono delta lactone and sodium gluconate can be combined with a conventional bulking agent such as for example lactose or starch, and blended into granulated form. Preferably, the granulated composition will have a sweetening power approximately equivalent to sugar on a weight for weight basis, so that 1 teaspoonful of the granulated composition will be equivalent in sweetness to about ½ to 2 teaspoonsful and more, preferably 1 teaspoonful of sucrose.

The sweetening composition of the present invention also can be extended with water so that aqueous solutions can be manufactured simply by dissolving the sweetening composition in water to the desired concentration. A preferable concentration is one in which two drops of the solution are equal in sweetness to from ½ to 2 teaspoonsful of sucrose.

The sweetening composition of the present invention can be formed simply by blending powdered sodium saccharin with powdered glucono delta lactone and powdered sodium gluconate. The ingredients in the desired proportions are mixed thoroughly and sifted to provide a uniform mixture. It may be desirable to mix the components of the composition with an aqueous-alcohol mixture and then carefully dry at a low temperature in accordance with normal granulation procedures to thereby form an extremely uniform composition which dissolves very quickly and consists of uniform granules of optimum size.

The sweetening composition of the present invention can be used in beverages, syrups, pastries, candies, puddings, gelatines and other desserts, and in any food item or beverage product in which sweetness is desired.

The following examples are given to further illustrate the present invention. The scope of the invention is not, however, meant to be limited to the specific details of the examples.

EXAMPLE 1

75 pounds of powdered sodium saccharin are thoroughly blended with 12.5 pounds of powdered sodium gluconate and 12.5 pounds of glucono delta lactone to provide a uniform mixture. The resulting mixture is several hundreds of times sweeter than natural sugar and can be used in place of the sugar to give a sweetening effect with essentially no caloric intake in all food and beverage products. Throughout the range of concentrations required to obtain conventional sweetness levels including highly sweetned beverages, the resulting sweetening effect is achieved with no bitter aftertaste. 1 gm. of the above sweetening composition is equivalent to about 1.5 gms. of sodium saccharin alone and to about 450 gms. of natural sugar (sucrose) on a weight-for-weight basis in concentrations giving a sweetness actually equivalent to 2.5% sucrose.

A cup of coffee sweetened with 22 milligrams (mg.) of the composition of Example 1, tastes as if it had been sweetened with 2 teaspoons (approx. 10 gms.) of ordinary sugar.

EXAMPLE 2

A sweetening composition is prepared in the manner of Example 1, using 90 pounds of sodium saccharin, 5 pounds of sodium gluconate and 5 pounds of glucono delta lactone.

EXAMPLE 3

A sweetening composition is prepared in the manner of Example 1, using 50 pounds of sodium saccharin, 25 pounds of sodium gluconate and 25 pounds of glucono delta lactone.

EXAMPLE 4

A sweetening composition is prepared in the manner of Example 1 using 70 pounds of sodium saccharin, 10 pounds of sodium glyconate and 20 pounds of glucono delta lactone.

EXAMPLE 5

A sweetening composition is prepared in the manner of Example 1, using 70 pounds of sodium saccharin, 20 pounds of sodium gluconate and 10 pounds of glucono delta lactone.

EXAMPLE 6

A sweetening composition is prepared in the manner of Example 1, using 60 pounds of sodium saccharin, 20 pounds of sodium gluconate and 20 pounds of glucono delta lactone.

EXAMPLE 7

A sweetening composition is prepared in the manner of Example 1, using 80 pounds of sodium saccharin, 10 pounds of sodium gluconate and 10 pounds of glucono delta lactone.

EXAMPLE 8

A granulated composition having a sweetening power approximately equivalent to sugar on a weight-for-weight basis is prepared by blending 8 pounds of sodium saccharin, 1 pound of sodium gluconate and 1 pound of glucono delta lactone with 449 pounds of lactose which serves as a bulking agent or extender. The powdered ingredients are thoroughly blended using a conventional mixing apparatus to provide a uniform mixture 5 grams (1 teaspoonful) of which is equivalent in sweetness to 5 grams of sugar.

EXAMPLE 9

222 gms. of the sweetening composition of Example 1, are dissolved in distilled water, qs. to 1000 ml., to which is added approximately 1 gm. each of benzoic acid, U.S.P., and methyl p-hydroxybenzoate as preservatives. 1 drop (0.05 ml.) of the resultant solution is equivalent to 5 gms. (1 teaspoonful) of sugar.

EXAMPLE 10

Tablets are made by blending a solution of 25 gms. of water and 5 gms. of acacia with 100 gms. of the powdered sweetening composition of Example 1. 5 gms. of sodium benzoate and 65 gms. of an inert extender e.g., lactose, are blended with the dried mixture which is then compressed into tablets. A tablet weighing 50 mg. is equivalent in sweetness to approximately 2 teaspoonsful of sugar. The tablet does not give an off-taste even though it contains a high concentration of saccharin.

From the above examples, it is seen that a sweetening composition consisting essentially of at least 50 percent of an edible salt of saccharin in admixture with in the range of about 5 to 25 percent by weight of glucono delta lactone and from about 5 to 25 percent by weight of sodium gluconate, provides sweetness levels which surprisingly are higher than those obtained with sodium saccharin alone. Further, in each of the examples given above, high levels of sweetness including the "bonus sweetness" are obtained without any bitter aftertaste.

What is claimed is:

1. A sweetening composition consisting essentially of at least 50 percent by weight of an edible salt of saccharin in admixture with in the range of about 5–25 percent by weight of glucono delta lactone and about 5–25 percent by weight of sodium gluconate.

2. The composition of claim 1 in combination with a solid pharmaceutical carrier and compressed into tablet form.

3. The composition of claim 2, wherein said tablet is equal in sweetness to from ½ to 2 teaspoonsful of sucrose.

4. The composition of claim 1 in combination with a bulking agent and blended into granulated form.

5. The composition of claim 4, wherein 1 teaspoonful of said granulated combination is equal in sweetness to form ½ to 2 teaspoonsful of sucrose.

6. The composition of claim 1 in combination with an aqueous carrier and dissolved into solution form.

7. The composition of claim 6, wherein 2 drops of said solution are equal in sweetness to from ½ to 2 teaspoonsful of sucrose.

8. The sweetening composition of claim 1, wherein said salt of saccharine is sodium saccharin.

9. The sweetening composition of claim 1, wherein said salt of saccharin is calcium saccharin.

References Cited

UNITED STATES PATENTS 3,489,572    4/1966    Kracauer _____ 99—141
3,285,751    11/1966   Kracauer _____ 99—141

RAYMOND N. JONES, Primary Examiner

R. B. ANDEWELT, Assistant Examiner